March 18, 1958     H. SCHNEIDER     2,827,133
HYDRAULIC TURBO BRAKE Filed June 9, 1952     7 Sheets-Sheet 1

INVENTOR.
Heinrich Schneider
ATTY.

March 18, 1958 H. SCHNEIDER 2,827,133
HYDRAULIC TURBO BRAKE
Filed June 9, 1952 7 Sheets-Sheet 2

INVENTOR.
Heinrich Schneider
ATTY.

United States Patent Office 2,827,133
Patented Mar. 18, 1958

2,827,133

HYDRAULIC TURBO BRAKE

Heinrich Schneider, Muncie, Ind., assignor to Schneider Brothers Company, a copartnership Application June 9, 1952, Serial No. 292,570

5 Claims. (Cl. 188—90)

This application is a continuation-in-part of my application, Serial No. 147,921, filed March 6, 1950, and now Patent No. 2,715,876.

The invention relates to hydraulic turbo brakes for general use but more particularly designed and intended for use in automotive vehicles, and especially those equipped with hydraulic torque converters.

The principal object of my invention is to provide a hydraulic turbo brake as a built-in addition or adjunct on a hydraulic torque converter, the runner of the brake being rigidly mounted on the turbine shaft of the torque converter and the brake being operated with the same fluid that is used in the converter.

A salient feature of the invention is the use of a hydraulic kinetic turbo brake with turbo ring circuit comprising a rotor, which is herein called a runner and a stator, the runner and stator being bladed with a view to circulation therebetween of a maximum volume of fluid by the use of blades that are preferably streamlined.

Another important object of my invention is the provision of means for cooling the brake fluid including a fan operated adjacent the radiator through which the fluid is circulated, the fan being driven by means of a turbine, which in turn is driven by the fluid discharged from the brake.

The invention is illustrated in the accompanying drawings, in which—

Similar reference numerals are applied to corresponding parts throughout the views.

Figure 1:
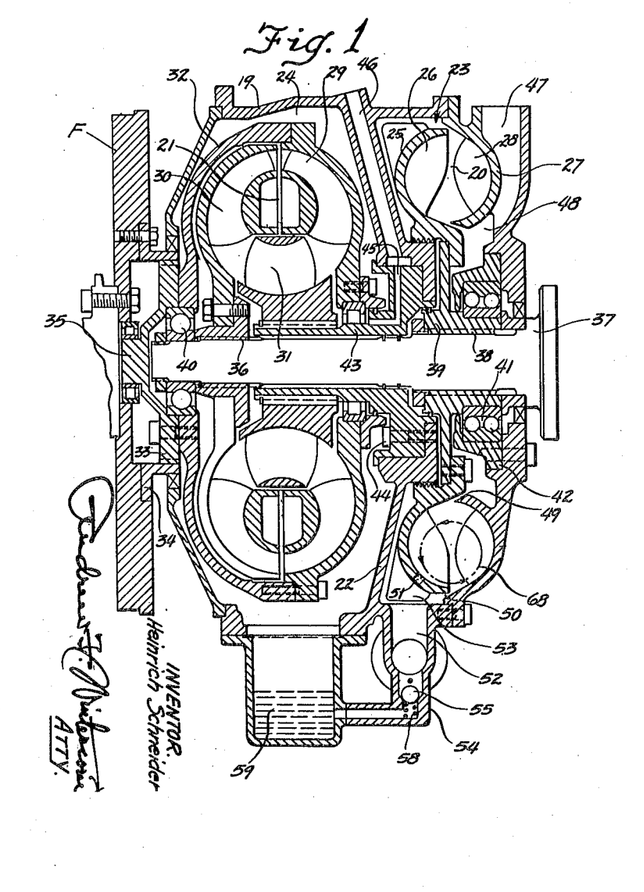
Fig. 1 is a section in a longitudinal plane through a torque converter with a built-in hydraulic turbo brake provided in accordance with my invention, the section being taken on the line A—A of Fig. 2.
Figure 2:
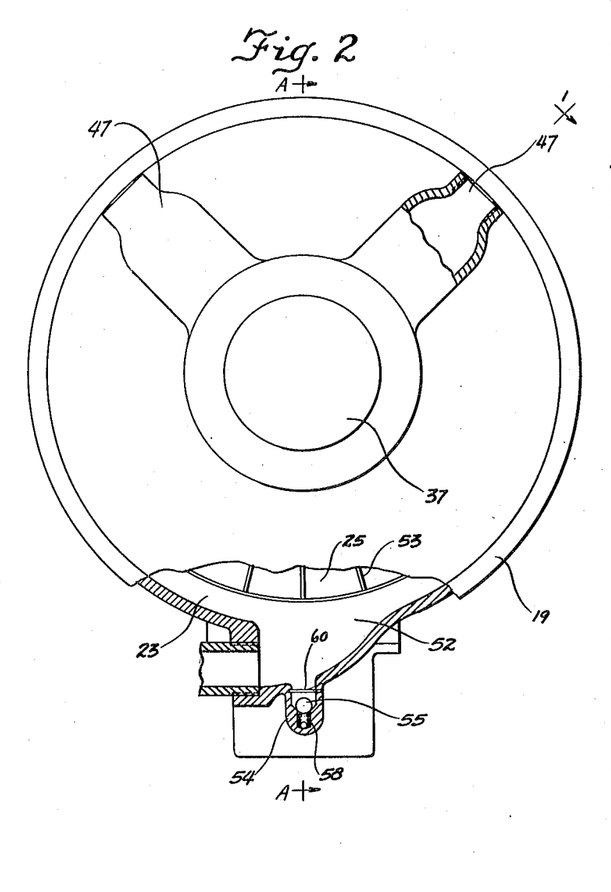
Fig. 2 is a rear view of the unit shown in Fig. 1.

Referring first to Figs. 1 and 2, two fluid circuits are provided in this composite design—a hydraulic turbo brake 20 and a hydraulic torque converter 21. The two fluid circuits are provided in a common housing 19 that is divided by a transverse wall 22 into a smaller brake compartment 23 and a larger torque converter compartment 24. In the brake compartment 23 the circuit is defined by a rotor or runner 25 carrying blades 26, and a stator or reactor 27 which forms the rear cover plate for the housing 19 and carries blades 28. The circuit of the torque converter 21 is defined by the pump 29, the turbine 30 and the reaction member 31. The fluid chamber of the torque converter is closed by a front cover 32 which is bolted to and drives the pump 29. This cover 32 is suitably bolted to a plate 33 carrying gear teeth meshing with internal gear teeth in a ring gear 34 that is suitably bolted to the back of the flywheel F of an internal combustion engine in an automotive vehicle, the axial pilot bearing extension 35 on the plate 33 being suitably received in a bearing fixed in coaxial relation to the rear end of the engine crank shaft, similarly as disclosed, for example, in my Patent 2,333,681. The turbine 30 is rigidly connected, as indicated at 36, with the output shaft 37 of the torque converter 21, and this shaft is also rigidly connected, as indicated at 38, to the hub 39 of the runner 25 of the brake 20. A bearing 40 supports the front end of the shaft 37 in coaxial relationship to the torque converter housing, and the hub 39 is mounted in a bearing 41 carried in a ring bracket 42 on the rear cover plate 27 for support of the rear end of the shaft 37. The reaction member 31 of the torque converter is rigidly mounted on a sleeve bracket 43 which in turn is rigidly connected, as indicated at 44, to the partition wall 22. Communicating passages 45 and 46 are provided in the bracket 43 and wall 22, respectively, for conducting fluid into and out of the torque converter. The fluid for braking purposes is delivered through radial passages 47 provided in the rear cover plate 27, the fluid entering an annular brake inlet chamber 48 from which it flows into the brake fluid circuit through an injector type ring nozzle 49. The brake fluid is discharged, some through the ring gap 50 and some through holes 51 provided in circumferentially spaced relation between the blades of the runner 25. The brake fluid thus discharged passes through an outlet 52 provided in the peripheral wall of the brake compartment 23, the discharge being aided by the additional centrifugal action of impeller vanes 53 that are provided on the outer side of the runner 25. In other words, similarly as the fluid is circulated in the torque converter circuit by the centrifugal action of the pump 29 and caused to flow through the turbine 30 and reaction member 31, so is the fluid circulated in the brake circuit by the centrifugal action of the blades 26 of the runner 25 discharging the fluid on the outer part of the circuit into the blades 28 of the stator or reactor 27, the fluid discharged from the radially inner ends of the blades 28 entering between the radially inner ends of the blades 26, as indicated by the arrows.

An automatic relief valve 54 is provided at the bottom of the outlet 52 to enable complete emptying of the brake compartment 23 of fluid. This relief valve comprises a ball 55 which is pressed downwardly under fluid pressure to its seat when the brake is filled and in operation. After the inlet valve 56 (Fig. 5) is closed the brake 20 is nearly emptied by the rotation of the runner 25 through discharge valve 57 to substantially the level of the lower edges of the blades 53. The fluid pressure in the outlet 52 by that time has dropped sufficiently for the spring 58 to unseat the ball 55 so that the remaining fluid will drain promptly through the relief valve 54 into the sump 59 of the torque converter. A cross-pin 60 keeps the ball 55 confined close enough to its seat to insure its closing promptly under fluid pressure and yet permit the same to unseat far enough to permit drainage of the brake fluid in the manner described.

Figure 3:
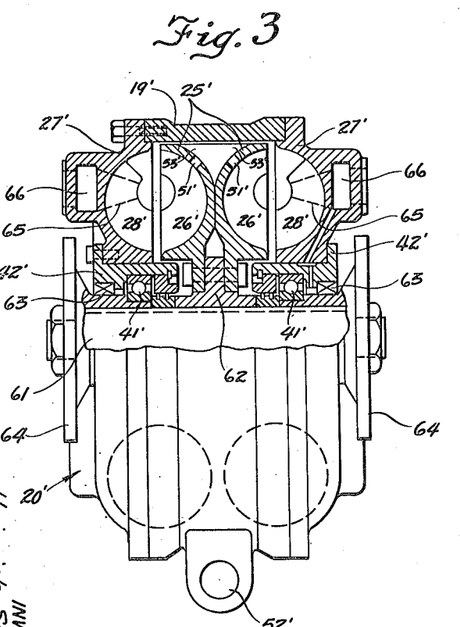
Fig. 3 is a view partly in side elevation and partly in longitudinal section of an independent hydraulic turbo brake unit having a pair of runners in tandem operating in twin circuits.
Figure 4:
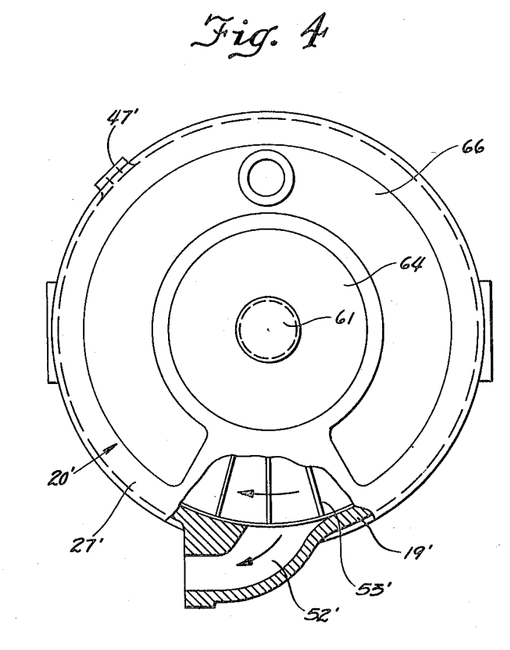
Fig. 4 is an end view of the unit shown in Fig. 3.

Referring next to Figs. 3 and 4, an independent brake unit is illustrated having twin, dual, or tandem brake means therein. Parts corresponding to what are disclosed in Figs. 1 and 2 have been given the same numbers using prime numerals. Thus the housing 19' corresponds to the housing 19 of Figs. 1 and 2, etc. Shaft 61 has two runners 25' mounted thereon in opposed relation on a hub 62 splined on the shaft. These runners have blades 26' which cooperate with blades 28' of a pair of stators or reactors 27', which, like the stator 27 of Figs. 1 and 2, are in the form of cover plates bolted on the opposite ends of the housing 19'. The shaft 61 is mounted in bearings 41' provided in ring brackets 42' secured to the covers 27'. These ring brackets 42' carry oil seals 63 which minimize leakage of oil from the unit, the seals cooperating with the hubs of coupling flanges that are secured to the opposite ends of the shaft 61 for connection with whatever shaft or shafts are to have the braking action applied thereto. With this construction the bladed runners and cooperating covers form two coaxial circular fluid circuits into which braking fluid enters through passages 65 in the blades 28' from annular chambers 66 formed in the covers 27'. Brake fluid is delivered to these annular chambers 66 from the supply tank 67 (Fig. 5) through the inlet valve 56. Brake fluid is discharged from the peripheries of the runners through clearance space of runner 25' and housing 19' and the circumferentially spaced openings 51' that are provided in the runners between the blades 26', and, here again, there are radial vanes 53' on the outer sides of the runners which help to discharge the fluid through the outlet 52'. The oil discharged through the outlet 52' passes through the discharge valve 57 (Fig. 5) and is ultimately returned to the tank 67, as shown in Fig. 5.

Figure 5:
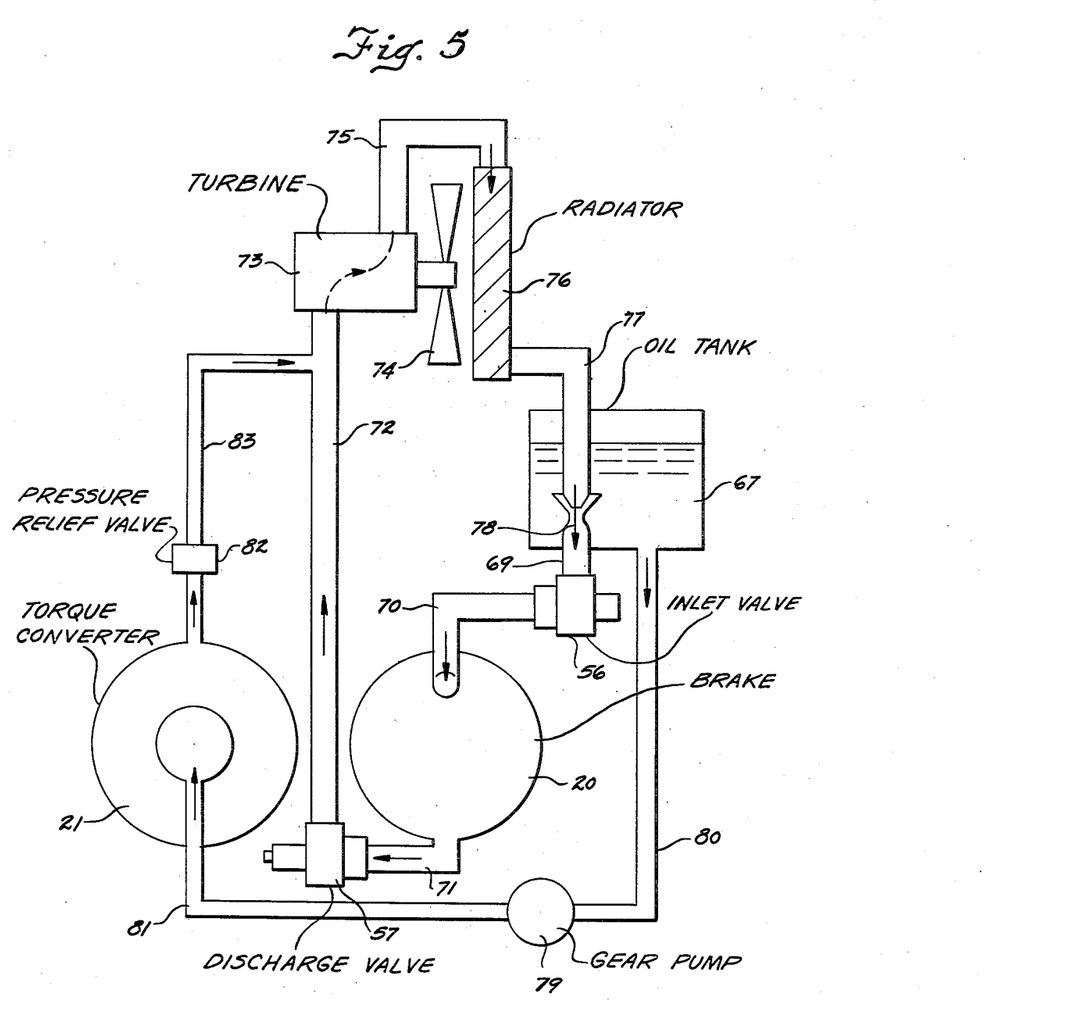
Fig. 5 is a fluid circuit and piping diagram for the hydraulic turbo brake and associated torque converter.

Referring next to Fig. 5, in order to fill the brake 20 and put it into operation, inlet valve 56 is opened so that fluid will flow through pipes 69 and 70 into the brake housing. Pipe 70, therefore, communicates with inlets 47 in the case of Figs. 1 and 2 and inlet 47' in the case of Figs. 3 and 4. The fluid discharged from the brake is conducted through pipe 71 and discharge valve 57 and pipe 72 to a turbine 73 whereby to drive a fan 74. The fluid leaving the turbine 73 is conducted through a pipe 75 into one end of a radiator 76 through which the fluid is conducted for cooling.

The cooled fluid discharged from the radiator is conducted through a pipe 77 back into the tank 67, where it discharges into an injector 78 communicating with the inlet pipe 69 previously mentioned, completing the cycle. A parallel circuit is provided for the torque converter 21 as follows: Gear pump 79 pumps fluid from tank 67 through pipe 80 and discharges the fluid into the torque converter 21 through pipe 81. The torque converter is connected through a pressure relief valve 82 and pipe 83 with the pipe 72, and hence any fluid discharged from the torque converter will be conducted through turbine 73 and radiator 76 through the injector 78 into the brake, or overflow into the tank 67.

Figure 6:
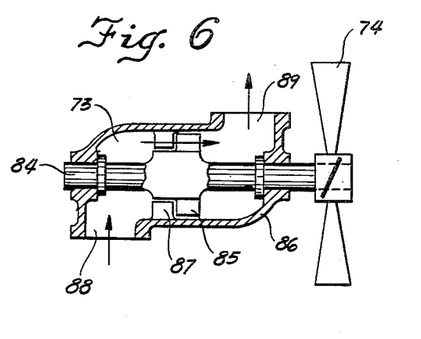
Fig. 6 is a fragmentary sectional detail of a portion of Fig. 5 showing the turbine drive for the fan which is driven by the discharge fluid from the brake.

In Fig. 6 there is illustrated the turbine 73 and fan 74 driven thereby. The turbine consists of a shaft 84 carrying turbine blades 85 inside a housing 86. The latter has guide vanes 87 provided therein and the fluid enters the housing 86 at 88 on one side of the guide vanes 87 and is discharged at the other end 89.

Figure 7:
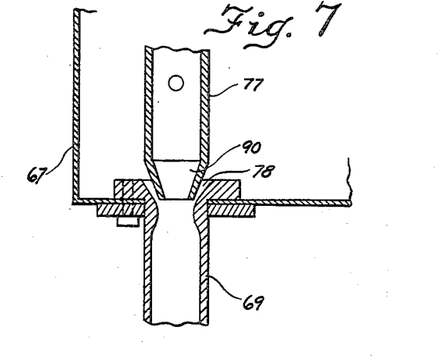
Fig. 7 is also a fragmentary sectional detail of a portion of Fig. 5 showing the injector discharging into the inlet pipe of the brake.

In Fig. 7 I have shown the injector 78 as provided in the bottom of the tank 67 and connected with the inlet pipe 69. Pipe 77, discharging oil from the radiator 76, has a tapered end 90 serving as an injector nozzle discharging into the throat of the injector 78. Hence, the oil discharged from pipe 77 into pipe 69 either entrains oil from the tank 67 to increase the flow of oil through the brake, or, when the inlet valve 56 (Fig. 5) is closed, the oil is discharged into the tank 67.

Figures 8, 9:
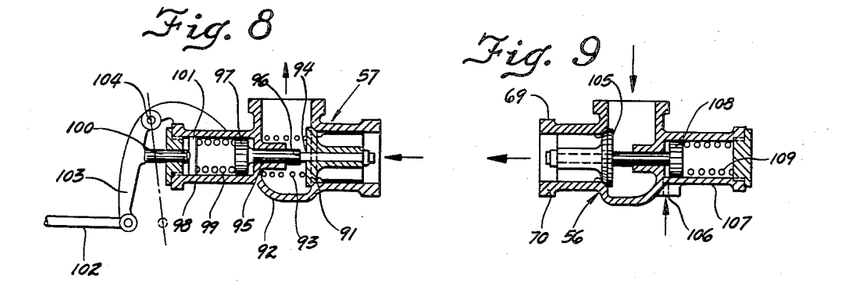
Fig. 8 is another fragmentary sectional detail of a portion of Fig. 5 showing the discharge valve of the brake.
Fig. 9 is still another fragmentary sectional detail of a portion of Fig. 5 showing the inlet valve of the brake.

Fig. 8 illustrates the discharge valve 57 of Fig. 5. A valve 91 is provided in the housing 92 and arranged to be opened by the brake discharge pressure against the action of the spring 93. A certain amount of clearance is provided at 94 to allow the valve 91 to open against the light pressure of spring 93, but further opening movement of the valve is restricted by the stem 95 when the valve 91, sliding on the stem, strikes the annular shoulder 96 and moves the stem 95 and piston 97 in the cylinder 98, where a spring 99 is provided affording a much greater resistance to valve opening movement. A plunger 100 moves a spring abutment 101 in the cylinder 98 to change the loading of spring 99 on piston 97, and this plunger is arranged to be operated by manual operation of rod 102 which is connected to the outer end of a lever 103 pivoted with respect to the cylinder 98 at 104 and engaging the plunger 100 intermediate its ends. With this construction it will be seen that valve 91 operates automatically in response to discharge pressure of fluid from the brake 20 (Fig. 5) and the valve opens more when the speed of the brake runner is increased, but filling and brake capacity can be overruled and controlled by manual adjustment of rod 102 changing the pressure of spring 99.

Fig. 9 shows the inlet valve 56 for the brake 20. Fluid from tank 67 keeps the inlet valve 56 closed, its valve element 105 acting as a check valve closing in the direction of flow. The valve is, however, arranged to be opened by compressed air delivered through the opening 106 into the cylinder 107 in front of the piston 108 to open the valve against the resistance of spring 109. When the air pressure is released the valve closes under action of the spring and is also assisted in its seating by the fluid pressure.

Figure 10:
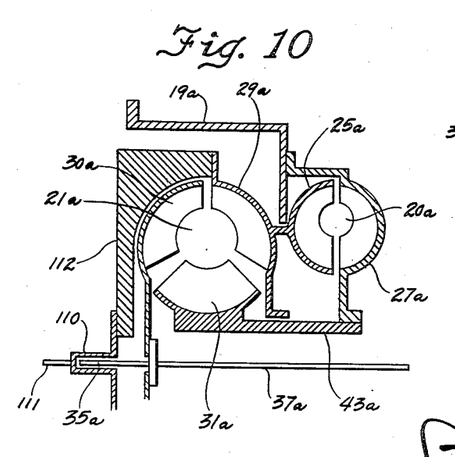
Fig. 10 is a more or less diagrammatic section along the lines of Fig. 1 but showing a brake runner turning with the converter pump.

Fig. 10 illustrates a variation in the design of Fig. 1 wherein the brake 20a is combined with the torque converter 21a, but the runner 25a of the brake is rigidly connected to rotate with the pump 29a of the torque converter, instead of with the turbine 30a. The latter is connected only with the output shaft 37a. The output shaft is illustrated as having a pilot bearing end 35a received in a bearing 110 provided in the rear end of the engine crank shaft indicated at 111. Indicated at 112 is the flywheel connected to the crank shaft and having the pump 29a connected thereto. The reaction member 31a is shown as rigidly connected with the stationary housing 19a by virtue of its connection with the stator or reactor 27a that forms the rear cover plate of the brake housing and is rigidly connected with the torque converter housing 19a.

Figure 11:
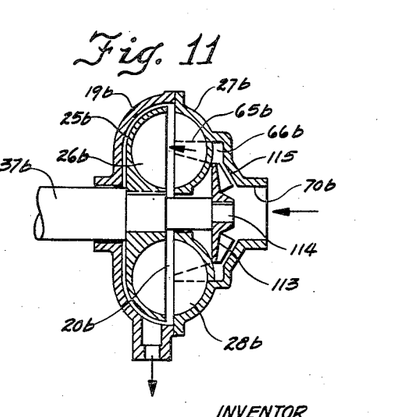
Fig. 11 is a section through another hydraulic turbo brake embodying a centrifugal pump turning with the brake runner for fast filling.

Fig. 11 shows still another brake construction 20b in which the runner 25b turns with the shaft 37b in the stationary housing 19b, and the stator or reactor 27b forms the rear cover of said housing and carries blades 28b to cooperate with the blades 26b of the runner. An annular channel 66b is provided in the stator 27b which communicates through passages 65b in the blades 28b with the inside of the housing so that fluid can be delivered to the brake circuit. To speed up the filling of the brake and fluid circulation through the brake a centrifugal pump impeller 113 is rigidly mounted on an extension 114 of the shaft 37b in a pump housing 115 formed as a central portion of the cover plate 27b and communicating around its outer periphery with the annular chamber 66b, whereby to pump fluid through the inlet 70b and discharge it under pressure into the brake.

In operation, the hydraulic brake of Fig. 1, Fig. 3, Fig. 10, or Fig. 11, is preferably controlled by operation of the standard brake pedal that otherwise operates only the mechanical brake or air brake, the first portion of the pedal stroke being used to operate an air valve to open the inlet valve 56, further movement in the second portion of the pedal stroke serving to compress the spring 99 in the discharge valve 57 to increase filling of the brake 20, after which the further movement of the brake pedal in the third portion of the stroke applies the mechanical or air brake and may, at the same time, close the inlet valve 56. Manual means may be provided to lock and unlock the plunger 100 of the discharge valve 57, by means of rod 102, whereby to insure its remaining in a predetermined position.

Figure 12:
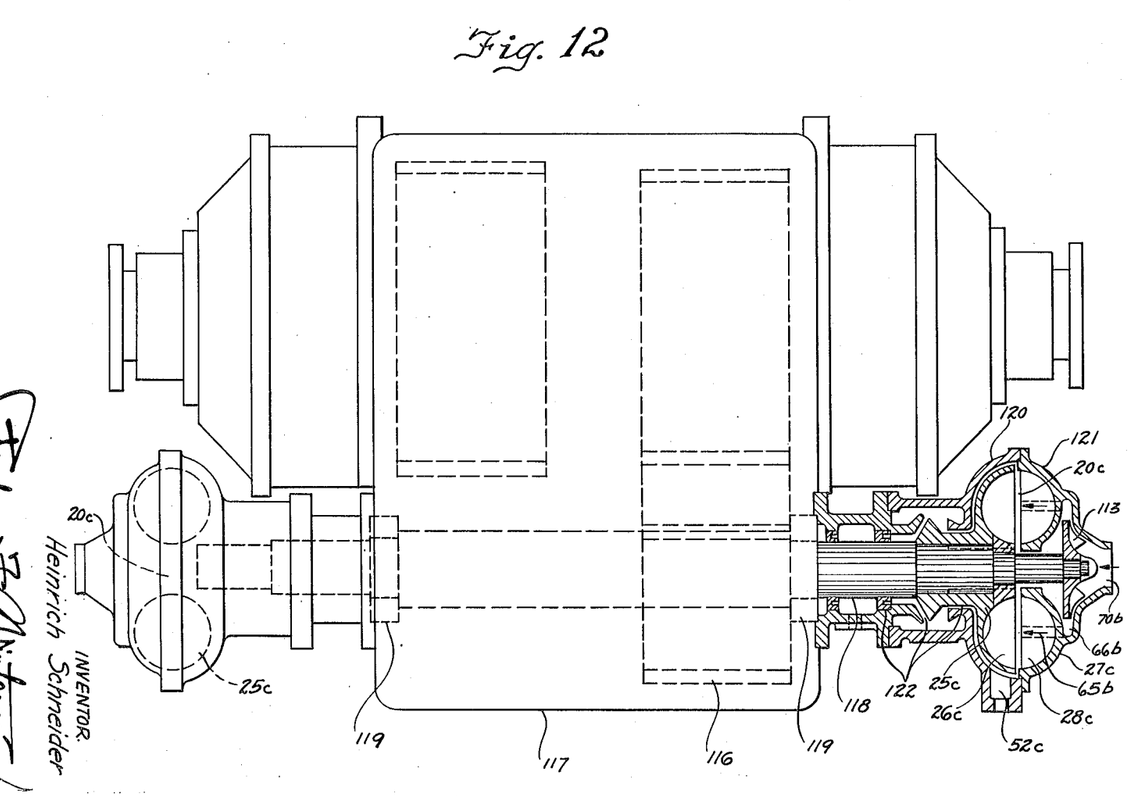
Fig. 12 is a view partly in side elevation and partly in longitudinal section showing another application of the hydraulic turbo brake in a locomotive where the brakes are provided on the idler shaft of the reverse gears in the transfer gear box, as disclosed in my copending application, Serial No. 147,921, filed March 6, 1950, the brake construction here closely resembling that shown in Fig. 16.
Figure 13:
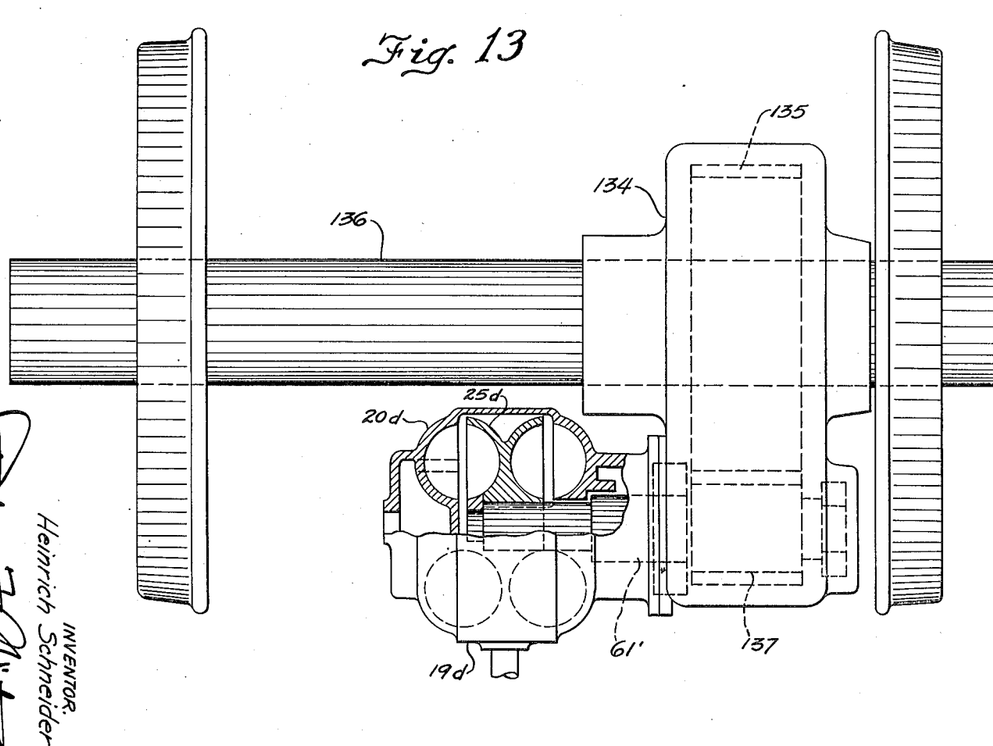
Fig. 13 is another view partly in elevation and partly in section showing a twin hydraulic brake as another locomotive application, the same being mounted on the axle reduction gear housing, this dual brake closely resembling that disclosed in Figs. 3 and 4.
Figure 14:
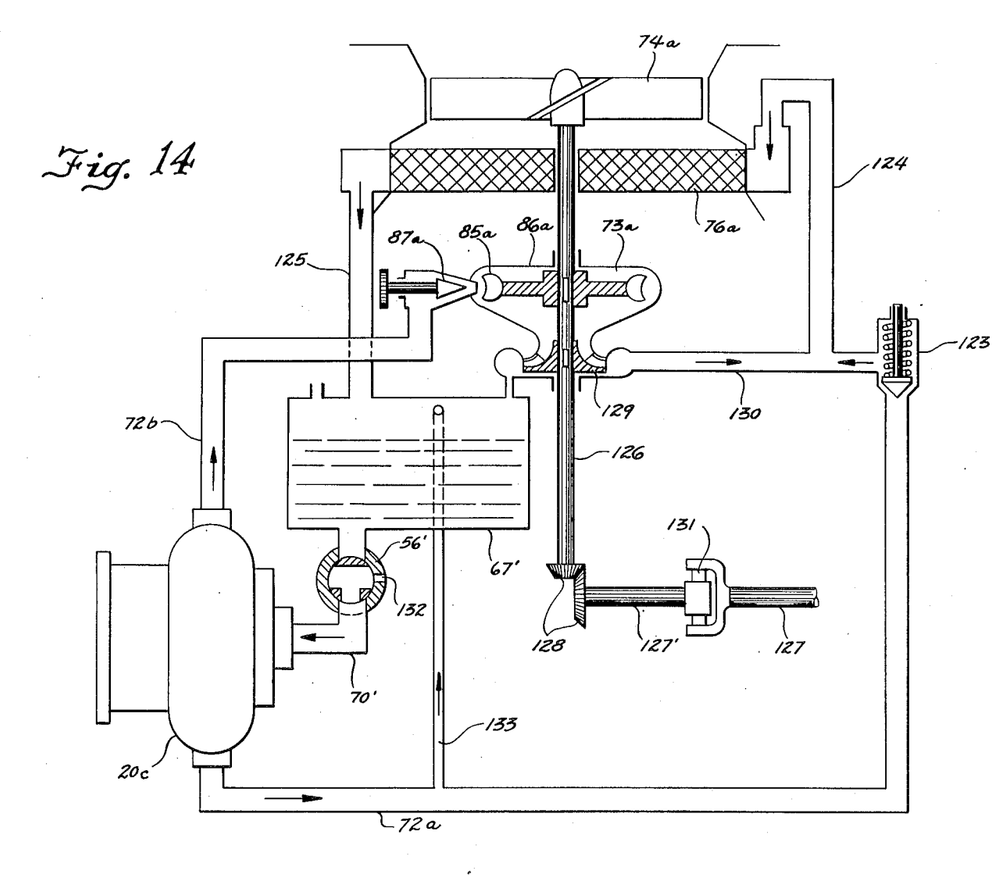
Fig. 14 is a diagram of the cooling and circulation system for hydraulic brakes, as originally disclosed in the aforesaid copending application.

Figs. 12 and 13 illustrate two locomotive applications of the hydraulic turbo brake, and Fig. 14 shows the diagram of the cooling and circulation system for these brakes as originally disclosed in my copending application, Serial No. 147,921, filed March 6, 1950.

Referring to Fig. 12, the gear indicated at 116 is the idler gear of the reverse gearing in the transfer gear box 117 and is fixedly mounted on the shaft 118 carried in bearings 119 provided therefor in the housing 117. On each free end extension of the shaft 118 is mounted an impeller 25c forming part of a hydraulic brake 20c. Stationary housings 120 and 121 enclose impeller 25c, the blades 26c of which are substantially radially disposed and cooperate with the substantially radial blades 28c in housing 121, so that the latter constitutes a reaction member 27c. Each runner or impeller 26c has a centrifugal pump impeller 113 turning with it, the same as in Fig. 11, for the same purpose. Seals 122 prevent brake fluid from getting into the transfer box 29 from either brake housing. The brakes 20c are preferably operated with water, but could be operated with oil or other fluid.

Each brake 20c, as disclosed in the copending application, is arranged to be filled from a cool water tank 67', as shown diagrammatically in Fig. 14, the water flowing through pipe 70' controlled by a 3-way valve 56', and entering reaction member housing 121. The centrifugal pump impeller 113 mounted on shaft 118 discharges water into chamber 66b from whence it flows through channels 65b in blades 28c to substantially the center of the vortex ring formed by impeller 25c and reaction member 27c. The fluid is discharged from brake 20c at high pressure as a result of the rotation of impeller 25c, the fluid going through pipes 72a and 72b communicating with a recess 52c at the periphery of housing 120. A relief valve 123 in pipe 72a lets the fluid escape through pipe 124 and through radiator 76a and pipe 125 back to tank 67', when the pressure exceeds a predetermined value. Fan 74a and radiator 76a are preferably the regular water cooling equipment for the power plant's cooling water. As the power plant is idling during braking this radiator 76a is used here to cool the brake water. To obtain increased cooling capacity the fan speed is increased during braking by means of a turbine 73a driven by the discharge water from the brake 20c. Fan 74a draws air through radiator 76a and is driven by shafts 126 and 127 that are connected by means of bevel gears 128, shaft 127 being driven either directly by the power plant or some auxiliary power source. Shaft 127 also drives the turbine 73a, which is preferably of the Pelton type, comprising a runner 85a enclosed by housing 86a. Some of the water discharged from the brake 20c is led through pipe 72b to the turbine nozzle 87a and impinges on the buckets of turbine runner 85a whereby to drive fan 74a. A centrifugal pump 129 arranged below the turbine 73a on shaft 126 discharges the water from the turbine through pipes 130 and 124 to the radiator 76a and thence to tank 67'. A one-way clutch 131 arranged between sections of driving shaft 127 allows section 127' of shaft 127 to be driven at increased speed by the turbine 23a and run faster than the other section of shaft 127, the one-way clutch 131 meanwhile over-running. The turbine 73a idles when the brake 20c is not in use and fan 74a is then driven by means of one-way clutch 131 by shaft 127. Inlet valve 56' is a 3-way valve letting water from tank 67' pass to the brake 20c in open position, and in closed position (as shown) closing the water off from the tank to the brake and letting atmospheric air through an opening 132 to the brake. The air is discharged by impeller 26c through pipe 72b and through turbine nozzle 87a or through the small by-pass pipe 133 to the tank 67', or both. This air circulation assists in completely blowing out the water from the brake 20c and cooling the brake during idling. By reducing the inlet area sufficiently a partial vacuum can be created in the brake 20c, which decreases the idling losses. By throttling either the water inlet valve 56' or the turbine nozzle 87a more or less, the filling of the brake 20c can be controlled and therewith the power absorption of the brake. The setting of the relief valve 123 determines the maximum power absorbing capacity of the brake.

Another arrangement of a hydraulic brake 20d on the axle drive gear housing 134 is shown in Fig. 13. This is a dual brake similar to that shown at 20' in Figs. 3 and 4. The large gear 135 on the axle 136 drives the pinion 137 of the brake shaft 61'. Brake housing 19d encloses the brake impeller 25d which forms with housing 19d two vortex ring circuits to balance the thrust and double the braking capacity. The general design, operation and cooling of this brake 20d is otherwise the same as described above for brakes 20, 20', 20a, 20b and 20c. In Fig. 12 the brake 20c on opposite ends of shaft 118 are preferably operated in parallel with the same cooling and valve system, and, in fact, all of the brakes on the axles are operated in parallel.

While I have disclosed the, at present, preferred form of means for insuring complete and quick emptying of the brake of the operating fluid, I do not limit the invention to that specific means, because other means may be employed, such as a gear pump for withdrawal of the fluid, or a means for supplying compressed air to expel the fluid.

It is believed the foregoing description conveys a good understanding of the objects and advantages of my invention. The appended claims have been drawn to cover all legitimate modifications and adaptations.

I claim:

1. In a hydraulic brake system comprising a hydraulic turbo brake consisting of a rotor and a stator provided with coacting fluid pockets, a radiator through which heated fluid from the brake is circulated and from which cooled fluid is delivered to the brake, a fan for inducing air circulation through the radiator for heat exchange, and a turbine driving said fan and driven by the waste energy of the fluid discharged from the brake, whereby to increase the fan speed and accordingly the cooling effect with increase in braking action, said radiator being also adapted to cool liquid for an engine, there being a shaft driven by the engine drivingly connected with the fan through an overrunning clutch, whereby the fan is driven by the engine between operations of the brake and the fan is adapted to be driven by the turbine at increased speeds when the brake is operated, in which operations the overrunning clutch overruns.

2. In a hydraulic brake system, the combination of a hydraulic brake consisting of a rotor and a stator provided with coacting fluid pockets, a fluid tank containing fluid for the brake circuit and connected to the inlet side of the brake, a cooler through which fluid from the discharge side of the brake is circulated before return to the fluid tank, a manually controlled inlet valve controlling delivery of fluid from the tank to the brake inlet, a check valve on the discharge side of the brake through which fluid in the brake is discharged through the cooler back to the tank, and an automatic pressure responsive valve through which the remainder of the fluid in the brake is adapted to be emptied by gravity into a sump, said valve being closed by a predetermined pressure in the brake.

3. In a hydraulic brake system, the combination of a hydraulic brake consisting of a rotor and a stator provided with coacting fluid pockets, a fluid tank containing fluid for the brake circuit and connected to the inlet side of the brake, a cooler through which fluid from the discharge side of the brake is circulated before return to the fluid tank, a manually controlled inlet valve controlling delivery of fluid from the tank to the brake inlet, a check valve on the discharge side of the brake through which fluid in the brake is discharged through the cooler back to the tank, an automatic pressure responsive valve through which the remainder of the fluid in the brake is adapted to be emptied by gravity into a sump, said valve being closed by a predetermined pressure in the brake, and an injector in the fluid tank connected with the discharge side of the brake and communicating with the inlet side of the brake as well as with the inside of the tank, whereby when the inlet valve is closed fluid discharged from the brake is discharged into the tank, but when the inlet valve is opened fluid discharged from the brake entrains fluid from the tank into the inlet of the brake to speed up the filling thereof and to increase the circulation velocity through the cooling system.

4. A hydraulic turbo brake comprising a housing, a rotor and a stator therein provided with coacting fluid pockets, means delivering operating fluid from a source of fluid supply to said brake through the stator and returning the fluid from said brake to said source through an outlet opening provided in the radially outer wall of said housing, said stator having its radially inner portion so conformed with relation to the radially inner portion of the rotor to define an annular injector passage through which fluid is conducted and drawn from the stator into the fluid pockets, the radially outer portion of the stator being so conformed with relation to the radially outer portion of the rotor to define an annular discharge passage in laterally spaced relation to but communicating with said outlet opening, the rotor having a substantially imperforate back wall and also having radially projecting impeller vanes provided on the back wall thereof in the path of fluid discharged from said pockets and operating directly across said outlet opening, whereby to speed up the discharge of fluid from the brake to the means returning the fluid to the source of fluid supply, the rotor back wall having a plurality of small discharge holes communicating with the fluid pockets in the rotor provided therein in circumferentially spaced relation and in laterally spaced relation to said annular discharge passage and arranged for direct discharge into said outlet opening between the impeller vanes.

5. In a hydraulic brake system, the combination of a hydraulic brake consisting of a rotor and a stator provided with coacting fluid pockets, a fluid tank containing fluid for the brake circuit and connected to the inlet side of the brake, a cooler through which fluid from the discharge side of the brake is circulated before return to the fluid tank, a manually controlled inlet valve controlling delivery of fluid from the tank to the brake inlet, a check valve on the discharge side of the brake through which fluid in the brake is discharged through the cooler back to the tank, an injector in the fluid tank connected with the discharge side of the brake and communicating with the inlet side of the brake as well as with the inside of the tank, whereby when the inlet valve is closed fluid discharged from the brake is discharged into the tank, but when the inlet valve is opened fluid discharged from the brake entrains fluid from the tank into the inlet of the brake to speed up the filling thereof and to increase the circulation velocity through the cooling system.

References Cited in the file of this patent

UNITED STATES PATENTS

| | | |
|---|---|---|
| 1,080,743 | Ahlquist | Dec. 9, 1913 |
| 1,256,709 | Ludeman | Feb. 19, 1918 |
| 1,863,128 | Salerni | June 14, 1932 |
| 2,113,109 | Mater | Apr. 5, 1938 |
| 2,116,992 | Weaver | May 10, 1938 |
| 2,155,740 | Seibold | Apr. 25, 1939 |
| 2,250,702 | Canaan | July 29, 1941 |
| 2,267,852 | Walker | Dec. 30, 1941 |
| 2,349,921 | Wemp | May 30, 1944 |
| 2,355,484 | Teker | Aug. 8, 1944 |
| 2,388,112 | Black et al. | Oct. 30, 1945 |
| 2,421,056 | Dake et al. | May 27, 1947 |
| 2,498,572 | O'Leary | Feb. 21, 1950 |
| 2,672,953 | Cline | Mar. 23, 1954 |
| 2,720,945 | Waldron et al. | Oct. 18, 1955 |

FOREIGN PATENTS

| | | |
|---|---|---|
| 796,449 | France | Apr. 7, 1936 |
| 426,816 | Germany | Mar. 18, 1926 |
| 251,900 | Great Britain | May 13, 1926 |